No. 755,139. PATENTED MAR. 22, 1904.
J. W. & C. D. KERR.
HARROW.
APPLICATION FILED JULY 17, 1903.
NO MODEL. 2 SHEETS—SHEET 1.

Witnesses
Charles Morgan

Inventors
J. W. KERR — C. D. KERR
Attorneys

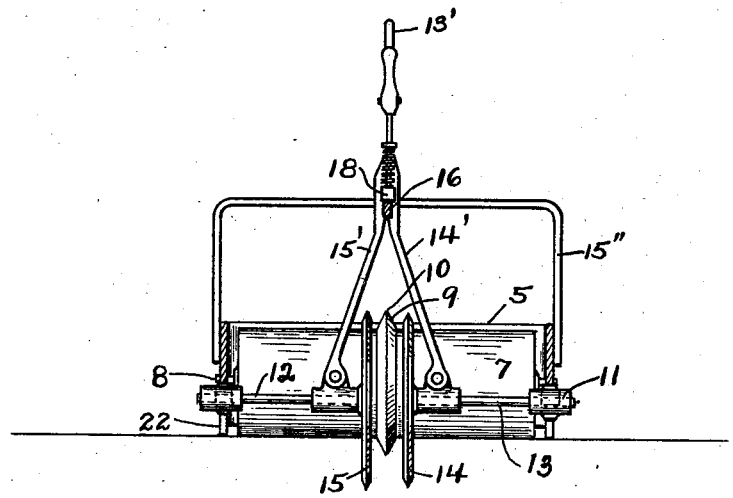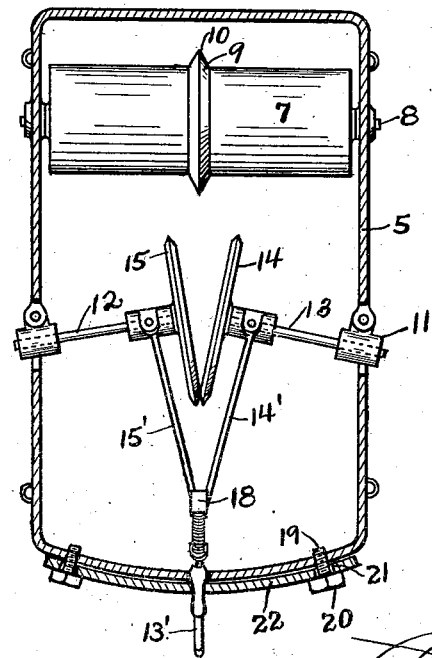

No. 755,139. Patented March 22, 1904.

UNITED STATES PATENT OFFICE.

JOHN W. KERR AND COLWELL D. KERR, OF PLATEAU CITY, COLORADO.

HARROW.

SPECIFICATION forming part of Letters Patent No. 755,139, dated March 22, 1904.

Application filed July 17, 1903. Serial No. 165,939. (No model.)

*To all whom it may concern:*

Be it known that we, JOHN W. KERR and COLWELL D. KERR, citizens of the United States, residing at Plateau City, in the county of Mesa, State of Colorado, have invented certain new and useful Improvements in Harrows; and we do hereby declare the following to be a full, clear, and exact description of the invention, such as will enable others skilled in the art to which it appertains to make and use the same.

This invention relates to farm implements; and it has for its object to provide an implement which will level the plowed ground, harrow the ground, open a furrow, and pack the ground at the sides of the furrow, a further object of the invention being to provide a specific-construction which will be simple and cheap of manufacture and efficient in its operation.

Figure 1:
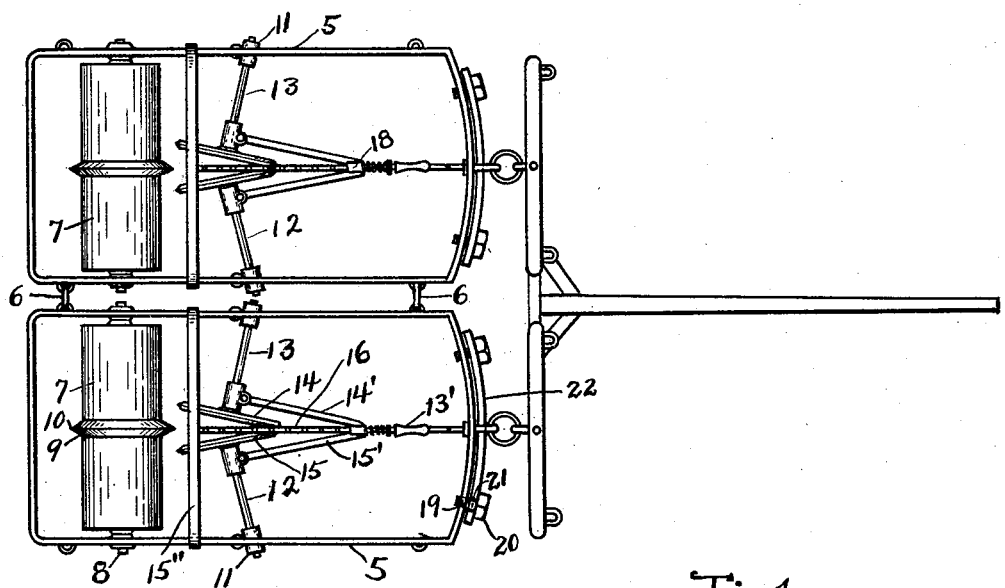
Figure 2:
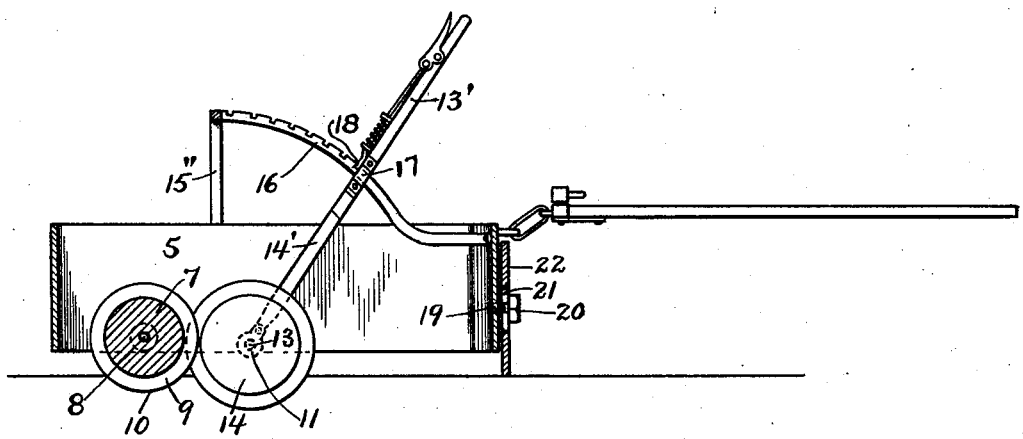

In the drawings, forming a portion of this specification, and in which like numerals of reference indicate similar parts in the several views, Figure 1 is a top plan view of the implement. Fig. 2 is a vertical section taken longitudinally through the implement. Fig. 3 is a vertical transverse section of the implement in advance of the disks looking rearwardly. Fig. 4 is a horizontal section through the frame of the machine, parts of the mechanism being shown in top plan.

Referring now to the drawings, the present implement comprises a plurality of frames 5, each of which is rectangular in form, and which frames are connected at their mutually-adjacent sides by links 6, so that said frames may have independent vertical movements. Transversely within each frame and adjacent to the rear end thereof is disposed a roller 7, the axle 8 thereof having bearings in the sides of the frame, these bearings being provided with the ordinary antifriction balls or rollers. The roller within each frame projects slightly below the lower edge thereof, and at the center of each roller is a circumscribing flange 9, which is tapered to a sharp edge 10, so that as the implement is drawn along the roller serves to roll the surface of the ground, while the flange of the roller of each frame forms a furrow. At the sides of each frame, in advance of the roller 7 therein, are bearings 11 in the form of swinging boxes, and in these boxes are journaled the shafts 12 and 13 of disks 14 and 15. The shafts are so positioned that they aline to hold their disks parallel or may be shifted at various angles to each other, so that the disks will stand at corresponding angles. To thus swing the shafts to change the positions of the disks with respect to each other, a lever 13' is provided, the lower end of which is bifurcated to form the divergent arms 14' and 15', the extremities of the arms having bearings in which are received the shafts of the disks at points adjacent to the latter.

A bow-shaped bar 15" is disposed transversely of each of the frames 5, with its ends attached to the sides of the latter, and attached to the central portion of each of these bars is a notched segment 16, having its opposite end attached to the front end of the frame and eccentric to the shafts of the disks when the latter are in alinement. The bifurcated lever in each frame straddles this notched segment and receives the latter in a guide 17 on the lever, so that when the lever is moved along the notched segment the shafts of the disks are swung pivotally, so that while the disks are parallel and in spaced relation when the lever is at the rear limit of its movement the disks lie at an acute angle to each other, with their front edges in close relation when the lever is at the forward limit of its movement. The lever is provided with a latch 18 for engagement with the notched segment to hold the lever at differents points of its adjustment.

In the front of the frame are perforations 19, which are threaded and receive clamping-screws 20, which are engaged through slots 21, formed vertically in a plate 22, which is disposed against the front of the frame. When the clamping-screws are loosened, the plate may be adjusted vertically, so that a greater or less portion thereof will depend below the front edge of the frame, the clamping-screws serving to hold the plate in its adjusted positions. The front of each frame is slightly convex and the scraper-plate thereon is correspondingly bowed, so that in the use of the plate, which serves to level the ground, the dirt will be urged longitudinally of the scraper-plate.

It will be seen from the above description that in the use of the present implement the surface of the earth is scraped. It is then treated by means of the disks and is finally rolled, so that the dirt is compressed and a furrow is formed therein.

To draw the implement, suitable draft appliances are attached to the fronts of the frame, and it will be understood that any desired number of frames may be employed, that modifications of the specific construction shown may be made, and that any suitable materials and proportions may be used for the various parts without departing from the spirit of the invention.

What is claimed is—

A harrow comprising a frame, a roller journaled transversely in the frame and having a circumscribing flange, disks mounted in advance of the flange of the roller and adjustable to lie at various angles, shafts for carrying the said disks, means for holding the disks in different adjusted positions consisting of a notched segment mounted eccentric of the said shafts when said shafts are in alinement, a bifurcated lever adapted to receive the notched segment and bearings for the said shaft on the extremities of the arms of the bifurcated lever, and bearings for the said shaft pivoted to the sides of the said frame.

In testimony whereof we affix our signatures in presence of two witnesses.

JOHN W. KERR.
COLWELL D. KERR.

Witnesses:
Jos. P. Baldridge,
Laura Kerr.